United States Patent Office 3,694,375
Patented Sept. 26, 1972

3,694,375
THIODIALKANOAMIDOPHENOL ANTIOXIDANTS
Martin Knell, 4 Possum Road, Ossining, N.Y. 10562, and Martin Dexter, 416 Cedar Drive, Briarcliff Manor, N.Y. 10510
No Drawing. Original application Mar. 25, 1969, Ser. No. 810,352. Divided and this application Dec. 21, 1970, Ser. No. 100,497
Int. Cl. C07c *103/38;* B01j *1/16*
U.S. Cl. 252—402                    5 Claims

ABSTRACT OF THE DISCLOSURE

Novel thiodialkanoamidophenol compounds are provided by a procedure involving the reaction of an alkylaminophenol and a thiodialkanoyl chloride. The thiodialkanoamidophenol products are useful as stabilizers of organic materials which are subject to oxidate deterioration.

---

This is a division of application Ser. No. 810,352 filed Mar. 25, 1969.

FIELD OF THE INVENTION

This invention relates to novel antioxidants for organic materials and particularly relates to thiodialkanoamidophenols. These compounds have been found to be useful as stabilizers of organic materials and generally, by including the novel antioxidants in organic materials, the organic materials are protected against oxidative deterioration.

SUMMARY OF THE INVENTION

The novel thiodialkanoamidophenols of the present invention have been found to be useful as stabilizers of organic materials which are subject to oxidative deterioration.

The active compounds of the present invention are obtained by a procedure involving the reaction of a selected alkylaminophenol with a thiodialkanoyl chloride. The novel antioxidant compounds of the present invention are incorporated in the organic material and as a result, the organic material will be protected against oxidative deterioration. The prevention of oxidation of various organic material is obviously of primary industrial concern and the novel antioxidant compounds of the present invention are used to prevent oxidative deterioration of a wide variety of commercial products such as synthetic polymers, oils, plastics, and the like.

PREFERRED EMBODIMENTS OF THE INVENTION

The novel thiodialkanoamidophenol antioxidant compounds of the present invention, more specifically designated as N,N'-bis(alkylhydroxyphenyl)thiaalkanedicarboxamides, are represented by the formula:

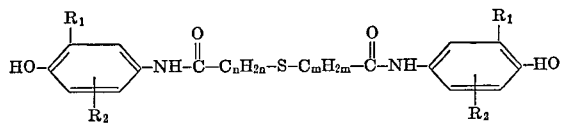

wherein $R_1$ is an alkyl group containing from 1 to 8 carbon atoms or a cycloalkyl group containing from 5 to 12 carbon atoms $R_2$ is hydrogen, an alkyl group containing from 1 to 8 carbon atoms or a cycloalkyl group containing from 5 to 12 carbon atoms $m$ and $n$ are numbers from 1 to 10.

Illustrative examples of alkyl groups are methyl, ethyl, propyl, isopropyl, butyl, amyl, hexyl, octayl, and the like. Included also within designation of "alkyl groups" are tertiary alkyl groups which have been found to be particularly effective and examples of such groups are t-butyl, t-amyl, t-octyl, and the like. Illustrative cycloalkyl groups include cyclopentyl, cyclohexyl, cyclooctyl, cyclododecyl, and the like.

The novel thiodialkanoamidophenol compounds of the present invention are prepared by a procedure involving the reaction between the selected alkylaminophenol and the thiodialkanoyl acid chloride. The reaction is carried out in a solution containing the reacting materials and useful solvents include, for example, acetone, pyridine, dimethylformamide, water, methylethylketone, methylisobutylketone, dioxane, and the like.

Stoichiometric amounts of the reactants are employed and a ratio of at least about 2 mols of the alkylaminophenol to about 1 mol of the acid chloride is used; generally an excess of the aminophenol, that, is an excess up to about 20%, has been found to be particularly useful.

The starting thiodialkanoyl acid chlorides are derived from the corresponding acids, i.e., the symmetrical as well as the unsymmetrical dibasic sulfide acids, said acids being reacted with a chlorinating agent such as, for example, thionyl chloride. The aforesaid acids are disclosed in Reid, "Organic Chemistry for Bivalent Sulfur," vol. III, 1960 edition (pages 217–219 i.e., 2-thiabutane-1,4-dicarboxylic acid, 1,3-dimethyl-2-thiapropane-,3-dicarboxylic acid). Procedures for preparing the dibasic sulfide acids are also set out in the aforesaid reference (page 181).

The starting aminophenols used in the present process are prepared by the general procedures described in U.S. Pat. 3,156,690.

In the course of the reaction, hydrogen chloride is liberated forming the amine hydrochloride and consequently an alkaline material is used to neutralize the hydrogen chloride. Suitable alkaline materials which are used to neutralize the hydrogen chloride include, for example, sodium or potassium hydroxide, sodium or potassium acetate, sodium or potassium carbonate, sodium or potassium bicarbonate, and the like.

Included among the acid chlorides which can be used are illustratively, acid chlorides of thiodiacetic acid, thiodipropionic acid, thiodibutyric acid, and the like.

In one typical reaction, 4-amino-2,6-di-tert-butylphenol dissolved in acetone, is added to a thiodialkanoyl acid chloride such as, thiodiacetyl chloride; the aforesaid reactants being used in a molar ratio of about 2:1. An alkaline material, such as, for example, sodium hydroxide, is then added to the solution, accompanied by agitation. The desired product is washed, selectively recovered and then dried to obtain the desired thiodialkanoamidophenol product.

The following examples detail the nature of the present invention but these examples are not to be considered as limiting the invention.

Example I 11.05 grams (0.05 mol) (4-amino-2,6-di-t-butylphenol are dissolved in acetone and 4.68 grams (0.025 mol) of thiodiacetyl chloride in acetone are added thereto portionwise, over a period of about 10 minutes, accompanied by agitation. It is noted that the reaction is only mildly exothermic. 10 mls. of 5 N sodium hydroxide is added portionwise, over a period of about 5 to 10 minutes, accompanied by agitation and here too, the reaction is mildly exothermic. The reaction mixture was allowed to stand for two hours, accompanied by occasional agitation.

There was then added to said reaction mixture, 200 mls. water and a dark oil separated, which solidified on cooling. The solid material was filtered, washed four times with 50 mls. cold petroleum ether and then dried in vacuo over paraffin wax.

The product thus obtained was dissolved in 125 mls. boiling 80% ethanol, filtered, treated with activated charcoal, filtered and then allowed to crystallize slowly. After cooling the crystals were filtered, washed with 80% ethanol and then air dried. The product was recrystallized from 80% ethanol and air dried. There was obtained a yield of 3.42 g. of the desired product, i.e., N,N'-bis(3',5'-di - t - butyl-4'-hydroxyphenyl)-2-thiapropane-1,3-dicarboxamide which melted between 227.5° C. and 228.5° C.

*Analysis.*—Calculated for $C_{32}H_{48}N_2O_4S$ (percent): C, 69.03; H, 8.69. Found (percent): C, 68.80; H, 8.69.

Example II

Following the procedure described in Example I supra, except for the use of 2,6-di-t-butyl-4-aminophenol and thiodipropionyl chloride, there was obtained N,N'-bis(3', 5' - di-t-butyl-4'-hydroxyphenyl)-3-thiapentane-1,5-dicarboxamide.

Example III

Following the procedure described in Example I supra, except for the use of 2-methyl-6-t-butyl-4-aminophenol and thiodibutyryl chloride, there was obtained N,N'-bis (3' - methyl-5'-t-butyl-4'-hydroxyphenyl)-4-thiaheptane-1,7-dicarboxamide.

Similarly, using the procedure described above, the following novel thiodialkanoamidophenol compounds are prepared:

N,N'-bis(3',5'-dimethyl-4'-hydroxyphenyl)-2-thiabutane-1,4-dicarboxamide

N,N'-bis(3'-t-butyl-4'-hydroxyphenyl)-1,3-dimethyl-2-thiapropane-1,3-dicarboxamide N,N'-bis(3',5'-dicyclohexyl-4'-hydroxyphenyl)-3-thiapentane-1,5-dicarboxamide N,N'-bis(3'-cyclododecyl-4'-hydroxyphenyl)-2-thiatridecane-1,13-dicarboxamide N,N'-bis(3',5'-di-t-amyl-4'-hydroxyphenyl)-3-thiapentane-1,5-dicarboxamide N(3'-t-butyl-6'-methyl-4'-hydroxyphenyl)-N'(3'',5''-di-t-butyl-4''-hydroxyphenyl)-3-thiapentane-1,5-dicarboxamide.

The compounds of the present invention are useful as stabilizers of organic materials normally subject to oxidative deterioration and such organic materials include: synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated aldehydes and unsaturated hydrocarbons such as butadienes and styrene; poly-$\alpha$-olefins such as polyethylene, polypropylene, polybutylene, polyisoprene, and the like, including copolymers of poly-$\alpha$-olefins, polyurethanes, polyamides such as polyhexamethylene adipamide and polycaprolactam; polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials which can be stabilized by the active compounds of the present invention include lubrication oil of the aliphatic ester type, i.e. di(2-ethylhexyl)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins and the like, fatty acids, soaps and the like.

In general the stabilizers of this invention are employed in amounts of from about 0.005 to about 5% by weight of the composition.

A particularly advantageous range for polyolefins, such as polypropylene is from about 0.05% to about 2%.

The stabilizers employed in this invention may be used alone or in combination with other stabilizers or additive materials. Especially useful in certain cases is the stabilizer dilauryl-$\beta$-thiodipropionate. Special mention is made of distearyl-$\beta$-thiodipropionate.

Furthermore, compounds of the formula:

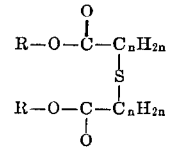

wherein

R is an alkyl group having from 6 to 24 carbon atoms; and $n$ is an integer from 1 to 6, are useful stabilizers in combination with the novel antioxidant compounds of the present invention.

Other antioxidants, antiozonants, thermal stabilizers, ultraviolet light absorbers, coloring materials, dyes, pigments, metal chelating agents, etc. may also be used in the compositions of the invention.

It should also be mentioned that phosphite esters may also be used in stabilized formulations containing the novel antioxidants of the present invention and such phosphite compounds include dialkyl phosphites such as, for example, distearyl phosphite, dilauryl phosphite, and the like, trialkyl phosphites such as, for example trilauryl phosphite, tris(ethylhexyl) phosphite, and the like, and tris(alkaryl) phosphites such as, for example tris(nonylphenyl)phosphites, and the like.

Example IV

Since the oxidation of organic materials is slow at ambient temperatures, even in the absence of antioxidants, the testing of the effects of antioxidants must be conducted at high temperatures in order to obtain results within a convenient time. The tests conducted on the following material were made following oven aging in a tubular oven, with an air flow of 400' per minute at a temperature of 150° C.

The procedure used involved thoroughly blending unstabilized polypropylene powder (Hercules Profax 6501) with 0.5% by weight of N,N'-bis(3',5'-di-tert-butyl-4'-hydroxyphenyl) - 2 - thiapropane - 1,3-dicarboxamide. The blended material was then milled on a two-roller mill at 182° C., for ten minutes, after which time the stabilized polypropylene was sheeted from the mill and allowed to cool.

The milled polypropylene sheet was then cut into pieces and pressed for seven minutes on a hydraulic press at 218° C. and 2,000 pounds per square inch pressure. The resultant sheet of 25 mil thickness was tested for resistance to accelerated aging in a forced draft oven at 150° C. It was found that on exposure of unstabilized polypropylene the sample failed within three hours. However, the polypropylene containing the aforementioned antioxidant material, that is, N,N'-bis(3',5'-di-tert-butyl-4'-hydroxyphenyl)-2-thiapropane-1, 3-dicarboxamide had an oven life of 860 hours.

Example V

Stabilized rubber is prepared by mixing in the cold:

| | Parts |
|---|---|
| Havea latex crepe | 100.0 |
| Stearic acid | 1.5 |
| Zinc oxide | 5.0 |
| Diphenylguanidine | 1.0 |
| Sulfur | 2.5 |
| N,N' - bis(3',5'-di-tert-butyl-4'-hydroxyphenyl)-2-thiapropane-1,3-dicarboxamide | 1.0 |

The resultant mixture is vulcanized at 140° C. and tested according to ASTM D-1206-52T. It is found that the time required to elongate a test strip from 120 mm. to 170 mm. is considerably shorter for the unstabilized rubber as compared with the stabilized rubber. Similarly, styrene-butadiene rubber as well as a blend of natural rubber (50 parts) and polybutadiene rubber (50 parts) are stabilized.

Example VI

High impact polystyrene resin containing elastomer (i.e., butadiene-styrene) is stabilized against loss of elongation properties by incorporation of 0.5% by weight of N,N'-bis(3',5'-di-tert-butyl-4'-hydroxyphenyl)-2 - thiapropane-1,3-dicarboxamide. Under the test conditions described below, the stabilized resin retains a higher percentage of its original elongation properties, whereas the unstabilized resin retains lessened elongation properties.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° C. and a pressure of 2000 pounds per square inch into a sheet of uniform thickness (25 mil). The sheets are then cut into strips, approximately 4 x 0.5 inches. A portion of these strips is then measured for length of elongation in the Instron Tensile tester (Instron Engineering Corporation, Quincy, Mass.). The remaining portion of the strips is aged in a forced draft oven for 6 weeks at 75° C. and thereafter tested for elongation.

The invention has been described with respect to certain preferred embodiments and various modifications and variations thereof will become obvious to persons skilled in the art. It is therefore to be understood that such modifications and variations are to be included within the spirit and scope of this invention.

We claim:

1. Organic material normally subject to oxidative deterioration containing a stabilizing amount of at least 1 thiodialkanoamidophenol compound of the formula:

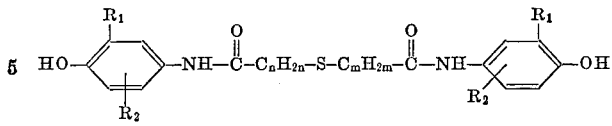

wherein $R_1$ is an alkyl group containing from 1 to 8 carbon atoms or a cycloalkyl group containing from 5 to 12 carbon atoms $R_2$ is an alkyl group containing from 1 to 8 carbon atoms or a cycloalkyl group containing from 5 to 12 carbon atoms $m$ and $n$ are numbers from 1 to 10.

2. The thiodialkanoamidophenol compound of claim 1 wherein $R_1$ and $R_2$ are tertiary-alkyl groups.

3. The thioalkanoamidophenol compound of claim 1 wherein $R_1$ and $R_2$ are tertiary-butyl groups.

4. The thioalkanoamidophenol compound of claim 1 wherein the compound is N,N'-bis(3',5'-di-tert-butyl-4'-hydroxyphenyl)-2-thiapropane-1,3-dicarboxamide.

5. The organic material of claim 1 containing from 0.005 to 5% by weight of the thiadialkanoamidophenol compound.

References Cited

UNITED STATES PATENTS 3,423,327   1/1969   Tracy _____ 252—402
3,590,083   6/1971   Dexter _____ 252—402

LEON D. ROSDOL, Primary Examiner

I. GLUCK, Assistant Examiner

U.S. Cl. X.R.

252—404, 406; 260—45.9 R, 45.95, 559 P